United States Patent
Lin

(10) Patent No.: US 8,806,079 B2
(45) Date of Patent: Aug. 12, 2014

(54) INTERFACE CIRCUIT AND AN ELECTRONIC DEVICE INCLUDING THE SAME

(75) Inventor: Tzu-Ping Lin, Hsinchu County (TW)

(73) Assignee: Wistron Neweb Corp., Hsinchu County (TW)

( * ) Notice: Subject to any disclaimer, the term of this patent is extended or adjusted under 35 U.S.C. 154(b) by 281 days.

(21) Appl. No.: 13/422,419

(22) Filed: Mar. 16, 2012

(65) Prior Publication Data

US 2012/0239828 A1  Sep. 20, 2012

(30) Foreign Application Priority Data

Mar. 18, 2011 (TW) .............................. 100109339 A

(51) Int. Cl.
*G06F 3/00* (2006.01)
*G06F 3/16* (2006.01)

(52) U.S. Cl.
CPC ...................................... *G06F 3/162* (2013.01)
USPC ................... 710/16; 710/15; 710/17; 710/18; 710/19

(58) Field of Classification Search
CPC .................................. G06F 3/00; G06F 3/162
See application file for complete search history.

(56) References Cited

U.S. PATENT DOCUMENTS

| | | | |
|---|---|---|---|
| 7,810,729 B2* | 10/2010 | Morley, Jr. | 235/449 |
| 7,896,248 B2* | 3/2011 | Morley, Jr. | 235/449 |
| 7,914,340 B2* | 3/2011 | Chung et al. | 439/668 |
| 7,918,394 B1* | 4/2011 | Morley, Jr. | 235/449 |
| 8,145,381 B2* | 3/2012 | Kim et al. | 701/36 |
| 8,231,055 B2* | 7/2012 | Wen | 235/449 |
| 8,413,901 B2* | 4/2013 | Wen | 235/449 |
| 8,640,953 B2* | 2/2014 | Dorsey et al. | 235/449 |
| 2002/0030871 A1* | 3/2002 | Anderson et al. | 359/150 |
| 2003/0081797 A1* | 5/2003 | Narasimhan | 381/94.1 |
| 2004/0204942 A1* | 10/2004 | Lee | 704/254 |
| 2007/0180170 A1* | 8/2007 | Choi et al. | 710/74 |
| 2007/0225035 A1* | 9/2007 | Gauger et al. | 455/553.1 |
| 2007/0298710 A1* | 12/2007 | Sams | 455/3.06 |
| 2009/0285408 A1* | 11/2009 | Kimura | 381/71.6 |
| 2010/0109749 A1* | 5/2010 | Chen et al. | 327/419 |
| 2010/0111320 A1* | 5/2010 | Koike | 381/80 |
| 2012/0079473 A1* | 3/2012 | Watanabe et al. | 717/170 |

* cited by examiner

*Primary Examiner* — Henry Tsai
*Assistant Examiner* — Jing-Yih Shyu
(74) *Attorney, Agent, or Firm* — Stroock & Stroock & Lavan LLP

(57) ABSTRACT

An interface circuit for use in an electronic device includes a switch module and a control module including signal receiving and transmitting pins. When a first audio terminal of the electronic device is electrically connected to a second audio terminal of another device, the control module controls the switch module to establish electrical connection between the signal receiving pin and the first audio terminal. The control module controls the switch module to establish electrical connection either between the signal transmitting pin and the first audio terminal for proceeding with a program update when updating information from the second audio terminal is received through the signal receiving pin or between an audio signal providing module of the electronic device and the first audio terminal when no updating information is received.

7 Claims, 3 Drawing Sheets

INTERFACE CIRCUIT AND AN ELECTRONIC DEVICE INCLUDING THE SAME

CROSS-REFERENCE TO RELATED APPLICATION

This application claims priority of Taiwanese Application No. 100109339 filed on Mar. 18, 2011, the disclosure of which is incorporated herein by reference.

BACKGROUND OF THE INVENTION

1. Field of the Invention

The present invention relates to an interface circuit, more particularly to an interface circuit for use in an electronic device without a synchronized dock connector and the electronic device.

2. Description of the Related Art

Referring to FIGS. 1 and 2, a conventional plug and play electronic device without a synchronized dock connector usually comprises an audio signal output circuit 920 that has an audio terminal 910 (e.g., a 3.5 mm phone jack) and that outputs an audio signal including AUDIO_R and AUDIO_L, a program updating circuit 940 that has a transceiving port connector 930, and a Microcontroller unit (MCU) 950. The program updating circuit 940 transmits an updating information to the MCU 950 for updating firmware or program stored in the MCU 950 when the updating information is received by the electronic device. Accordingly, two interface circuits (i.e. the audio signal output circuit 920 and the program updating circuit 940) are required in such an electronic device, resulting in relatively high manufacturing costs. In addition, the program updating interface circuit 940 is usually idle and is only in use when an update is performed.

SUMMARY OF THE INVENTION

Therefore, an object of the present invention is to provide an interface circuit that is an integration of an audio signal output circuit and a program updating circuit.

According to an aspect of the present invention, an interface circuit is for use in an electronic device including a first audio terminal and an audio signal providing module. The interface circuit comprises a detecting module, a control module, and a switch module. The detecting module is to be electrically connected to the first audio terminal and is capable of detecting whether the first audio terminal is electrically connected to a second audio terminal of another device. The control module includes a detecting pin electrically connected to the detecting module, a signal receiving pin, and a signal transmitting pin. The switch module is operable to establish electrical connection between the signal receiving pin and the first audio terminal, between the signal transmitting pin and the first audio terminal, and between the audio signal providing module and the first audio terminal. When it is detected by the detecting module that the first audio terminal is electrically connected to the second audio terminal, the control module controls the switch module to establish electrical connection between the signal receiving pin and the first audio terminal. The control module further controls the switch module to establish electrical connection between the signal transmitting pin and the first audio terminal so as to proceed with a program update upon determining that updating information from the second audio terminal is received thereby through the signal receiving pin. The control module further controls the switch module to establish electrical connection between the audio signal providing module and the first audio terminal such that an audio signal from the audio signal providing module is transmitted to the second audio terminal through the first audio terminal upon determining that no updating information is received thereby through the signal receiving pin.

In an implementation, the switch module includes a first switch unit and a second switch unit. The first switch unit is operable to establish electrical connection between the signal receiving pin and the first audio terminal, and between the signal transmitting pin and the first audio terminal. The second switch unit is operable to establish electrical connection between the first audio terminal and the audio signal providing module. The control module controls the first switch unit to establish electrical connection between the signal receiving pin and the first audio terminal when it is detected by the detecting module that the first audio terminal is electrically connected to the second audio terminal and to further establish electrical connection between the signal transmitting pin and the first audio terminal upon determining that updating information from the second audio terminal is received through the signal receiving pin. The control module controls the second switch unit to establish electrical connection between the audio signal providing module and the first audio terminal upon determining that no updating information is received thereby through the signal receiving pin.

In an implementation, the first audio terminal includes a grounded first pin, a second pin, a third pin, and a fourth pin electrically connected to the second pin. The control module further includes a first control pin and a second control pin. The first switch unit of the switch module includes a first communication port adapted to be electrically connected to the fourth pin, a first transmission port electrically connected to the signal receiving pin, a second communication port adapted to be electrically connected to the third pin, a second transmission port electrically connected to the signal transmitting pin, a first control port electrically connected to the first control pin of the control module and operable to enable electrical connection between the first communication port and the first transmitting port, and a second control port electrically connected to the second control pin of the control module and operable to enable electrical connection between the second communication port and the second transmitting port.

When it is detected by the detecting module that the first audio terminal is electrically connected to the second audio terminal, the control module transmits an enabling signal through the first control pin to the first control port for the first control port to enable electrical connection between the first communication port and the first transmitting port such that the signal receiving pin and the fourth pin are in electrical connection. The control module further transmits an enabling signal through the second control pin to the second control port for the second control port to enable electrical connection between the second communication port and the second transmitting port such that the signal transmitting pin and the third pin are in electrical connection upon determining that the updating information from the second audio terminal is received through the signal receiving pin.

Moreover, the control module further includes a third control pin. The audio signal from the audio signal providing module includes a first audio sub-signal and a second audio sub-signal. The second switch unit of the switch module includes a third communication port adapted to be electrically connected to the fourth pin of the first audio terminal and the first communication port of the first switch unit, a third transmitting port adapted to be electrically connected to the audio signal providing module for receiving the first audio sub-signal when it is determined by the control module that no updating information is received thereby through the signal receiving pin, a fourth communication port adapted to be electrically connected to the third pin of the first audio terminal and the second communication port of the first switch unit, a fourth transmitting port adapted to be electrically connected to the audio signal providing module for receiving the second audio sub-signal when it is determined by the control module that no updating information is received thereby through the signal receiving pin, and a third control port electrically connected to the third control pin of the control module and operable to enable electrical connection between the third communication port and the third transmitting port, and between the fourth communication port and the fourth transmitting port. When it is determined by the control module that no updating information is received thereby through the signal receiving pin, the control module transmits an enabling signal through the third control pin to the third control port for the third control port to enable electrical connection between the third communication port and the third transmitting port of the second switch unit, and between the fourth communication port and the fourth transmitting port of the second switch unit such that the first and second audio sub-signals from the audio signal providing module are respectively provided to the fourth and third pins of the first audio terminal.

The detecting module includes a first resistor and a second resistor connected in series between a power source and ground through the second pin and the fourth pin. The detecting module outputs a detecting signal at a junction of the first and second resistors when the first audio terminal is electrically connected to the second audio terminal.

According to another aspect of the present invention, an electronic device comprises the abovementioned first audio terminal, the abovementioned audio signal providing module, and the abovementioned interface circuit.

The advantages of the present invention reside in that a program updating circuit and an audio signal output circuit are integrated into a single interface circuit, such that the total number of components is reduced. Hence, a relatively low manufacturing cost for the interface circuit of the present invention may be achieved. Additionally, the presence of the second switch unit allows for a reduction of pop-noise while the second audio terminal is electrically connected to the first audio terminal.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
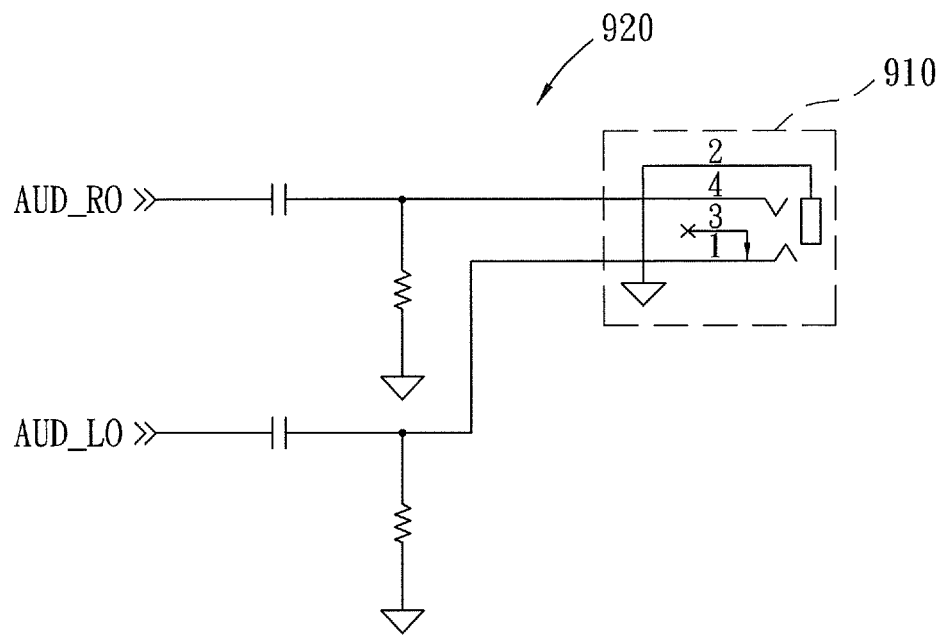
FIG. 1 is a circuit diagram of an audio signal output circuit of a conventional electronic device without a synchronized dock connector.
Figure 2:
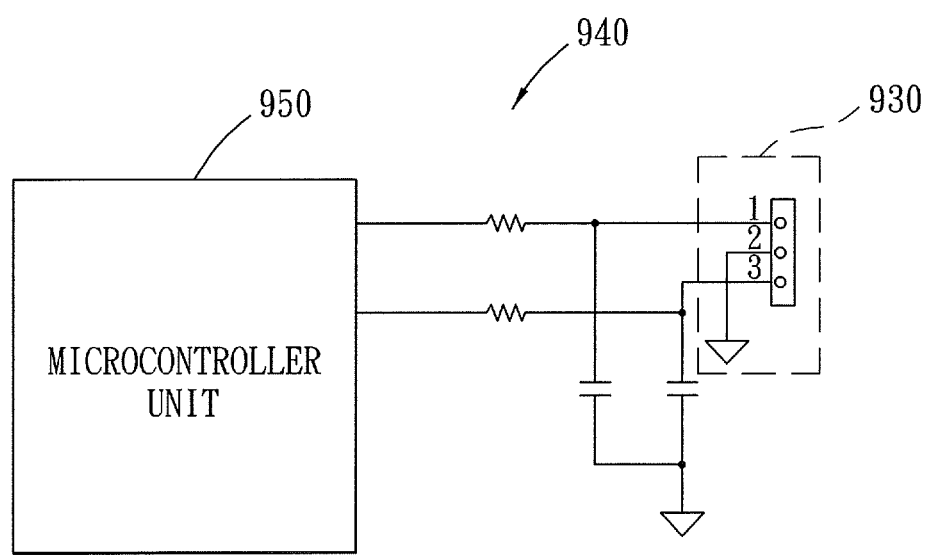
FIG. 2 is a circuit diagram of a program updating circuit and a Microcontroller unit of the conventional electronic device.
Figure 3:
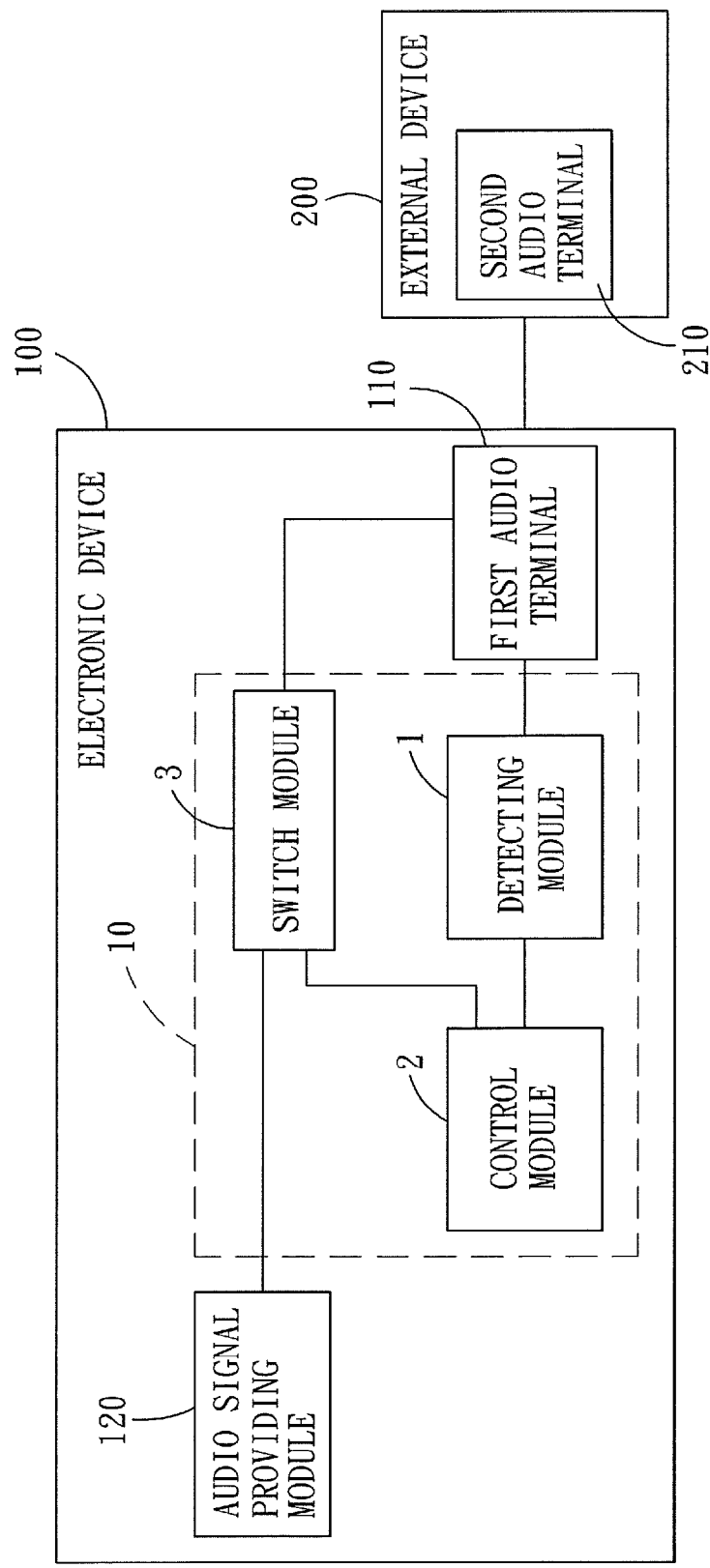
FIG. 3 is a schematic block diagram of an electronic device according to an embodiment of the present invention.

Referring to FIG. 3, according to the embodiment of the present invention, an interface circuit 10 is for use in a plug and play (PNP) electronic device 100 without a synchronized dock connector. In this embodiment, the electronic device 100 is a vehicle audio system, but the present invention is not limited in this respect. The electronic device 100 includes a first audio terminal 110 and an audio signal providing module 120. The first audio terminal 110 can be removably and electrically connected to a second audio terminal 210 of an external device 200. The first audio terminal 110 is a 3.5 mm audio socket and the second audio terminal 210 is a 3.5 mm audio plug in this embodiment.

Figure 4:
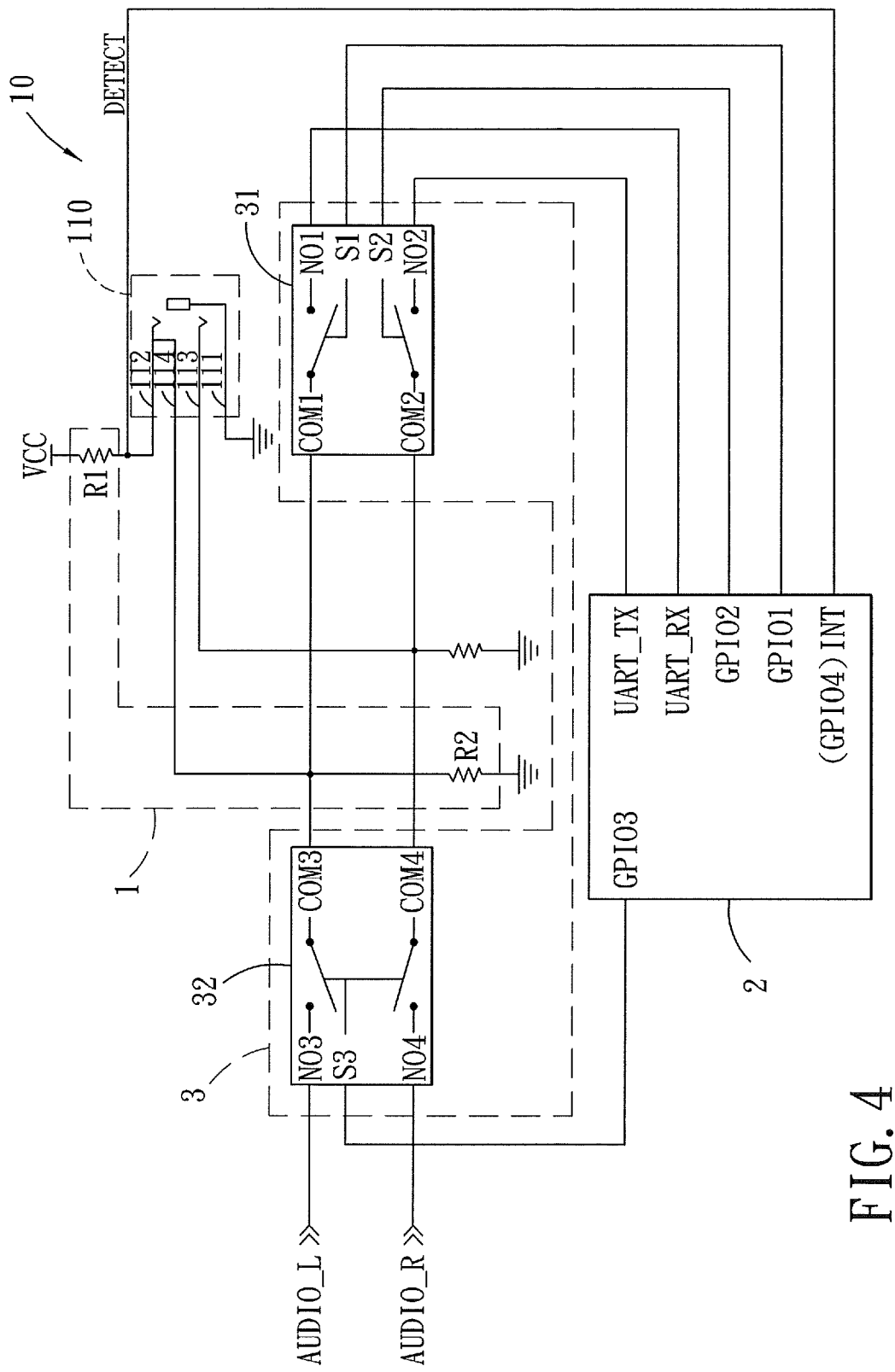
FIG. 4 is a circuit diagram of an interface circuit of the embodiment.

Further referring to FIG. 4, the first audio terminal 110 includes a grounded first pin 111, a second pin 112, a third pin 113, and a fourth pin 114 electrically connected to the second pin 112.

The interface circuit 10 comprises a detecting module 1, a control module 2, and a switch module 3. The detecting module 1 is a voltage divider that includes a first resistor (R1) and a second resistor (R2) connected in series between a power source (VCC) and ground through the second pin 112 and the fourth pin 114 of the first audio terminal 110. In this embodiment, the resistance of the second resistor (R2) is smaller than that of the first resistor (R1). The detecting module 1 is electrically connected to the first audio terminal 110 and is capable of detecting whether the first audio terminal 110 is electrically connected to a second audio terminal of another device (e.g., the second audio terminal 210 of the external device 200). Voltage at a junction of the first and second resistors (R1, R2) that is outputted by the detecting module 1 is at a low voltage level when the first audio terminal 110 is not electrically connected to the second audio terminal 210 and is at a high voltage level when the first audio terminal 110 is electrically connected to the second audio terminal 210. The high voltage level of this voltage serves as a detecting signal (DETECT) outputted by the detecting module 1 as an indication of the first audio terminal 110 being electrically connected to the second audio terminal 210.

The control module 2 is a Microcontroller unit (MCU) that includes a first control pin (GPIO1), a second control pin (GPIO2), a third control pin (GPIO3), a detecting pin (INT (GPIO4)), a signal receiving pin (UART_RX), and a signal transmitting pin (UART_TX). It is noted that the detecting pin (INT), the first control pin (GPIO1), the second control pin (GPIO2) and the third control pin (GPIO3) are General Purpose Input/Output ports (GPIO), and that the signal receiving pin (UART_RX) and the signal transmitting pin (UART_TX) respectively serve as input and output pins of a Universal Asynchronous Receiver Transmitter (UART) (not shown) of the control module 2. The detecting pin (INT) is electrically connected to the second pin 112 of the first audio terminal 110, and the control module 2 receives the detecting signal (DETECT) through the detecting pin (INT) when the first audio terminal 110 is electrically connected to the second audio terminal 210.

The switch module 3 includes a first switch unit 31 and a second switch unit 32. The first switch unit 31 includes a first communication port (COM1), a first transmission port (NO1), a second communication port (COM2), a second transmission port (NO2), a first control port (S1), and a second control port (S2). The first communication port (COM1) is electrically connected to the fourth pin 114 of the first audio terminal 110, the first transmission port (NO1) is electrically connected to the signal receiving pin (UART_RX) of the control module 2, the second communication port (COM2) is electrically connected to the third pin 113 of the first audio terminal 110, and the second transmission port (NO2) is electrically connected to the signal transmitting pin (UART_TX). The first control port (S1) is electrically connected to the first control pin (GPIO1) of the control module 2 and is operable to enable electrical connection between the first communication port (COM1) and the first transmitting port (NO1). The second control port (S2) is electrically connected to the second control pin (GPIO2) of the control module 2 and is operable to enable electrical connection between the second communication port (COM2) and the second transmitting port (NO2). Consequently, the first switch unit 31 is operable to establish electrical connection between the signal receiving pin (UART_RX) and the first audio terminal 110, and between the signal transmitting pin (UART_TX) and the first audio terminal 110.

The second switch unit 32 includes a third communication port (COM3), a third transmitting port (NO3), a fourth communication port (COM4), a fourth transmitting port (NO4), and a third control port (S3). The third communication port (COM3) is electrically connected to the fourth pin 114 of the first audio terminal 110 and the first communication port (COM1) of the first switch unit 31. The fourth communication port (COM4) is electrically connected to the third pin 113 of the first audio terminal 110 and the second communication port (COM2) of the first switch unit 31. The third and fourth transmitting ports (NO3, NO4) are electrically connected to the audio signal providing module 120 for receiving respectively a first audio sub-signal (AUDIO_L) and a second audio sub-signal (AUDIO_R) of audio signal therefrom. The third control port (S3) is electrically connected to the third control pin (GPIO3) of the control module 2 and is operable to enable electrical connection between the third communication port (COM3) and the third transmitting port (NO3) and between the fourth communication port (COM4) and the fourth transmitting port (NO4). Accordingly, the second switch unit 32 is operable to establish electrical connection between the first audio terminal 110 and the audio signal providing module 120.

When it is detected by the detecting module 1 that the first audio terminal 110 is electrically connected to the second audio terminal 210, the control module 2 receives the detecting signal (DETECT) through the detecting pin (INT) and transmits an enabling signal through the first control pin (GPIO1) to the first control port (S1) of the first switch unit 31 for the first control port (S1) to enable electrical connection between the first communication port (COM1) and the first transmitting port (NO1) such that the signal receiving pin (UART_RX) and the fourth pin 114 are electrically connected. Subsequently, the control module 2 determines whether updating information from the second audio terminal 210 is received through the signal receiving pin (UART_RX), and further transmits an enabling signal through the second control pin (GPIO2) to the second control port (S2) for the second control port (S2) to enable electrical connection between the second communication port (COM2) and the second transmitting port (NO2) such that the signal transmitting pin (UART_TX) and the third pin 113 are electrically connected when it is determined that updating information is received. Consequently, a two-way information exchange router is established between the control module 2 and the external device 200 so as to perform program update on the electronic device 100.

It should be noted that no electrical connection is established between the third communication port (COM3) and the third transmitting port (NO3) and between the fourth communication port (COM4) and the fourth transmitting port (NO4) of the second switch unit 32 as controlled by the control module 2 through the third control pin (GPIO3) during the program update such that the audio signal from the audio signal providing module 120 cannot be transmitted to the interface circuit 10 to avoid interference with the program update.

When it is determined by the control module 2 that no updating information is received thereby through the signal receiving pin (UART_RX), the control module 2 transmits an enabling signal through the third control pin (GPIO3) to the third control port (S3) of the second switch unit 32 for the third control port (S3) to enable electrical connection between the third communication port (COM3) and the third transmitting port (NO3) and between the fourth communication port (COM4) and the fourth transmitting port (NO4) of the second switch unit 32, such that the first and second audio sub-signals (AUDIO_L, AUDIO_R) of the audio signal from the audio signal providing module 120 are respectively provided to the fourth and third pins 114, 113 of the first audio terminal 110 for subsequent transmission to the external device 200 via the second audio terminal 210. Similarly, when the interface circuit 10 receives the audio signal from the audio signal providing module 120, no electrical connection is established between the first communication port (COM1) and the first transmitting port (NO1) and between the second communication port (COM2) and the second transmitting port (NO2) of the first switch unit 31 as controlled by the control module 2 through the first and second control pins (GPIO1, GPIO2).

Therefore, the control module 2 of the interface circuit 10 is capable of determining whether the updating information is received thereby so as to determine whether to proceed with the program update or to transmit the audio signal from the audio signal providing module 120 to the external device 200 via the first and second audio terminals 110, 210. In addition, to prevent interference between performance of these two functions, the control module 2 is capable of cutting off electrical connections necessary for the other function but unwanted during performance of the current function. Consequently, the two functions can be integrated into a single interface circuit 10, such that the total number of components is reduced. Additionally, the presence of the second switch unit 32 allows for a reduction of pop-noise while the second audio terminal 210 is electrically connected to the first audio terminal 110.

To sum up, a program updating circuit and an audio signal output circuit are integrated into the interface circuit 10 of the present invention. Hence, a relatively low manufacturing cost for the interface circuit may be achieved. In addition, the first and second switch units 31, 32 can prevent interference between audio signal output and program update as controlled by the control module 2.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An interface circuit for use in an electronic device, the electronic device including a first audio terminal and an audio signal providing module, the interface circuit comprising:
   a detecting module electrically connected to the first audio terminal, and detecting whether the first audio terminal is electrically connected to a second audio terminal of another device;
   a control module including a detecting pin electrically connected to the detecting module, a signal receiving pin, and a signal transmitting pin; and a switch module for establishing electrical connection between the signal receiving pin and the first audio terminal, between the signal transmitting pin and the first audio terminal, and between the audio signal providing module and the first audio terminal;

wherein when the detecting module detects that the first audio terminal is electrically connected to the second audio terminal, the control module controls the switch module to establish electrical connection between the signal receiving pin and the first audio terminal, the control module further controls the switch module to establish electrical connection between the signal transmitting pin and the first audio terminal so as to proceed with a program update upon determining that updating information from the second audio terminal is received thereby through the signal receiving pin, and the control module further controls the switch module to establish electrical connection between the audio signal providing module and the first audio terminal such that an audio signal from the audio signal providing module is transmitted to the second audio terminal through the first audio terminal upon determining that no updating information is received thereby through the signal receiving pin; and wherein the switch module includes:
a first switch unit for establishing electrical connection between the signal receiving pin and the first audio terminal, and between the signal transmitting pin and the first audio terminal; and
a second switch unit for establishing electrical connection between the first audio terminal and the audio signal providing module;
the control module controlling the first switch unit to establish electrical connection between the signal receiving pin and the first audio terminal when the detecting module detects that the first audio terminal is electrically connected to the second audio terminal and to further establish electrical connection between the signal transmitting pin and the first audio terminal upon determining that updating information from the second audio terminal is received through the signal receiving pin, the control module controlling the second switch unit to establish electrical connection between the audio signal providing module and the first audio terminal upon determining that no updating information is received thereby through the signal receiving pin.

2. The interface circuit according to claim 1, wherein the first audio terminal includes a grounded first pin, a second pin, a third pin, and a fourth pin electrically connected to the second pin, wherein the control module further includes a first control pin and a second control pin, and the first switch unit of the switch module includes:
a first communication port electrically connected to the fourth pin;
a first transmission port electrically connected to the signal receiving pin;
a second communication port electrically connected to the third pin;
a second transmission port electrically connected to the signal transmitting pin;
a first control port electrically connected to the first control pin of the control module and operable to enable electrical connection between the first communication port and the first transmitting port; and
a second control port electrically connected to the second control pin of the control module, for enabling electrical connection between the second communication port and the second transmitting port; and wherein when the detecting module detects that the first audio terminal is electrically connected to the second audio terminal, the control module transmits an enabling signal through the first control pin to the first control port for the first control port to enable electrical connection between the first communication port and the first transmitting port such that the signal receiving pin and the fourth pin are electrically connected, the control module further transmits an enabling signal through the second control pin to the second control port for the second control port to enable electrical connection between the second communication port and the second transmitting port such that the signal transmitting pin and the third pin are electrically connected upon determining that the updating information from the second audio terminal is received through the signal receiving pin.

3. The interface circuit according to claim 2, wherein the audio signal from the audio signal providing module includes a first audio sub-signal and a second audio sub-signal, wherein the control module further includes a third control pin, and the second switch unit of the switch module includes:
a third communication port electrically connected to the fourth pin of the first audio terminal and the first communication port of the first switch unit;
a third transmitting port electrically connected to the audio signal providing module for receiving the first audio sub-signal therefrom when the control module determines that no updating information is received through the signal receiving pin;
a fourth communication port electrically connected to the third pin of the first audio terminal and the second communication port of the first switch unit;
a fourth transmitting port electrically connected to the audio signal providing module for receiving the second audio sub-signal therefrom when the control module determines that no updating information is received through the signal receiving pin; and
a third control port electrically connected to the third control pin of the control module and, for enabling electrical connection between the third communication port and the third transmitting port, and between the fourth communication port and the fourth transmitting port;

wherein when the control module determines that no updating information is received thereby through the signal receiving pin, the control module transmits an enabling signal through the third control pin to the third control port for the third control port to enable electrical connection between the third communication port and the third transmitting port of the second switch unit, and between the fourth communication port and the fourth transmitting port of the second switch unit such that the first and second audio sub-signals from the audio signal providing module are respectively provided to the fourth and third pins of the first audio terminal.

4. The interface circuit according to claim 2, wherein the detecting module includes a first resistor and a second resistor connected in series between a power source and ground through the electrically connected second and fourth pins, the detecting module outputting a detecting signal at a junction of the first and second resistors when the first audio terminal is electrically connected to the second audio terminal.

5. An electronic device comprising:
a first audio terminal that is connected to a second audio terminal of another device;
an audio signal providing module; and an interface circuit that includes:
- a detecting module electrically connected to the first audio terminal, and detecting whether the first audio terminal is electrically connected to the second audio terminal,
- a control module including a detecting pin that is electrically connected to the detecting module, a signal receiving pin, and a signal transmitting pin, and
- a switch module for establishing electrical connection between the signal receiving pin and the first audio terminal, between the signal transmitting pin and the first audio terminal, and between the audio signal providing module and the first audio terminal;
- wherein when the detecting module detects that the first audio terminal is electrically connected to the second audio terminal, the control module controls the switch module to establish electrical connection between the signal receiving pin and the first audio terminal, the control module further controls the switch module to establish electrical connection between the signal transmitting pin and the first audio terminal so as to proceed with a program update upon determining that updating information from the second audio terminal is received thereby through the signal receiving pin, and the control module further controls the switch module to establish electrical connection between the audio signal providing module and the first audio terminal such that an audio signal from the audio signal providing module is transmitted to the second audio terminal through the first audio terminal upon determining that no updating information is received thereby through the signal receiving pin; and wherein the switch module includes:
- a first switch unit for establishing electrical connection between the signal receiving pin and the first audio terminal, and between the signal transmitting pin and the first audio terminal; and
- a second switch unit for establishing electrical connection between the first audio terminal and the audio signal providing module;
- the control module controlling the first switch unit to establish electrical connection between the signal receiving pin and the first audio terminal when the detecting module detects that the first audio terminal is electrically connected to the second audio terminal and to further establish electrical connection between the signal transmitting pin and the first audio terminal upon determining that updating information from the second audio terminal is received through the signal receiving pin, the control module controlling the second switch unit to establish electrical connection between the audio signal providing module and the first audio terminal upon determining that no updating information is received thereby through the signal receiving pin.

6. The electronic device according to claim 5, wherein the electronic device is a plug and play electronic device without a synchronized dock connector.

7. The electronic device according to claim 5, wherein one of the first and second audio terminals is a 3.5 mm audio plug, and the other of the first and second audio terminals is a 3.5 mm audio socket.

* * * * *